United States Patent
Malhotra et al.

(10) Patent No.: US 11,593,651 B2
(45) Date of Patent: Feb. 28, 2023

(54) METHOD AND SYSTEM FOR TRAINING A NEURAL NETWORK FOR TIME SERIES DATA CLASSIFICATION

(71) Applicant: Tata Consultancy Services Limited, Mumbai (IN)

(72) Inventors: Pankaj Malhotra, Noida (IN); Jyoti Narwariya, Noida (IN); Lovekesh Vig, Gurgaon (IN); Gautam Shroff, Gurgaon (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 439 days.

(21) Appl. No.: 17/005,155

(22) Filed: Aug. 27, 2020

(65) Prior Publication Data
US 2021/0103812 A1  Apr. 8, 2021

(30) Foreign Application Priority Data
Aug. 28, 2019  (IN) .............................. 201921034646

(51) Int. Cl.
*G06N 3/08* (2006.01)
*G06F 16/28* (2019.01)

(52) U.S. Cl.
CPC ............. *G06N 3/08* (2013.01); *G06F 16/285* (2019.01)

(58) Field of Classification Search
CPC ................................ G06N 3/08; G06F 16/285
See application file for complete search history.

(56) References Cited

U.S. PATENT DOCUMENTS

| | | |
|---|---|---|
| 2018/0018451 A1 | 1/2018 | Spizhevoy et al. |
| 2019/0097865 A1* | 3/2019 | Xu ........................ A61B 5/4809 |
| 2019/0130231 A1 | 5/2019 | Liu et al. |
| 2019/0158340 A1* | 5/2019 | Zhang .................. H04B 17/318 |
| 2019/0166030 A1* | 5/2019 | Chen ....................... H04L 7/042 |

* cited by examiner

*Primary Examiner* — Minh Chau Nguyen
(74) *Attorney, Agent, or Firm* — Finnegan, Henderson, Farabow, Garrett & Dunner, LLP

(57) ABSTRACT

Neural networks can be used for time series data classification. However, in a K-shot scenario in which sufficient training data is unavailable to train the neural network, the neural network may not produce desired results. Disclosed herein are a method and system for training a neural network for time series data classification. In this method, by processing a plurality of task specific data, a system generates a set of updated parameters, which is further used to train a neural network (network) till a triplet loss is below a threshold. The network is trained on a diverse set of few-shot tasks sampled from various domains (e.g. healthcare, activity recognition, and so on) such that it can solve a target task from another domain using only a small number of training samples from the target task.

9 Claims, 8 Drawing Sheets

METHOD AND SYSTEM FOR TRAINING A NEURAL NETWORK FOR TIME SERIES DATA CLASSIFICATION

PRIORITY CLAIM

This U.S. patent application claims priority under 35 U.S.C. § 119 to: India Application No. 201921034646, filed on Aug. 28, 2019. The entire contents of the aforementioned application are incorporated herein by reference.

TECHNICAL FIELD

The disclosure herein generally relates to training a data model, and, more particularly, to a method and system for training a neural network for time series data classification.

BACKGROUND

A time series data set represents data pertaining to specific parameters, collected over a period of time. Such data find application in a variety of fields. For example, weather data collected over a period of time can be used for generating weather predictions. In case of an industrial plant monitoring, data pertaining to various parameters of the plant can be used for assessing/predicting plant performance.

Data can be collected using appropriate sensors. Amount/quantity of such data collected over a period of time could be huge. As analyzing/processing huge quantity of data can be a cumbersome task, appropriate time series data classification approaches can be used to classify and extract required data, over time windows. Considering volume and complexity of such data collected over a period of time, the time series classification when handled manually can be a cumbersome task and may even be prone to errors.

The inventors here have recognized several technical problems with such conventional systems, as explained below. As machine learning is a popular and evolving field, the same can be used to automate the time series data classification. In the machine learning approach, machine learning algorithms build mathematical data models using sample data (also known as training data). Accuracy with which a data model can perform a task depends on quality and quantity of training data used to train/generate the model. However, in some scenarios, the amount of training data available is minimal, and this may not be sufficient for state of art training approaches to generate appropriate data models.

SUMMARY

Embodiments of the present disclosure present technological improvements as solutions to one or more of the above-mentioned technical problems recognized by the inventors in conventional systems. For example, in one embodiment, For example, in one embodiment, a processor implemented method for time series data classification is provided. In this method, at least one time series classification task is collected as input, via one or more hardware processors, wherein the time series classification task comprises a training set of time series data and number of classes across the time series classification tasks varies. Further, a neural network is trained using at least one initial parameter to solve the at least one time series classification task, via the one or more hardware processors. The training of the neural network comprises iteratively performing till an average triplet loss on a plurality of validation tasks is less than a threshold, sampling a pre-defined number of time series classification tasks; consolidating a set of updated parameters from the sampled time series classification tasks; obtaining a final set of updated parameters from the consolidated set of updated parameters; and using the final set of updated parameters along with data pertaining to the at least one time series classification task to train the neural network. Then the time series data classification is performed using the neural network, via the one or more hardware processors.

In another aspect, a system for time series data classification is provided. The system includes one or more hardware processors, one or more communication interfaces, and one or more memory modules storing a plurality of instructions. The plurality of instructions when executed cause the one or more hardware processors to collect at least one time series classification task as input, wherein the time series classification task comprises a training set of time series data. The system then trains a neural network using at least one initial parameter to solve the at least one time series classification task, wherein training the neural network comprises iteratively perform till an average triplet loss on a plurality of validation tasks is less than a threshold, sampling a pre-defined number of time series classification tasks; consolidating a set of updated parameters from the sampled time series classification tasks; obtaining a final set of updated parameters from the consolidated set of updated parameters; and using the final set of updated parameters along with data pertaining to the at least one time series classification task to train the neural network. The system then performs the time series data classification using the neural network.

In yet another aspect, a non-transitory computer readable medium for time series data classification is provided. The non-transitory computer readable medium performs the method given below to perform the time series data classification by executing the following method. In this method, at least one time series classification task is collected as input, via one or more hardware processors, wherein the time series classification task comprises a training set of time series data and number of classes across the time series classification tasks varies. Further, a neural network is trained using at least one initial parameter to solve the at least one time series classification task, via the one or more hardware processors. The training of the neural network comprises iteratively performing till an average triplet loss on a plurality of validation tasks is less than a threshold, sampling a pre-defined number of time series classification tasks; consolidating a set of updated parameters from the sampled time series classification tasks; obtaining a final set of updated parameters from the consolidated set of updated parameters; and using the final set of updated parameters along with data pertaining to the at least one time series classification task to train the neural network. Then the time series data classification is performed using the neural network, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
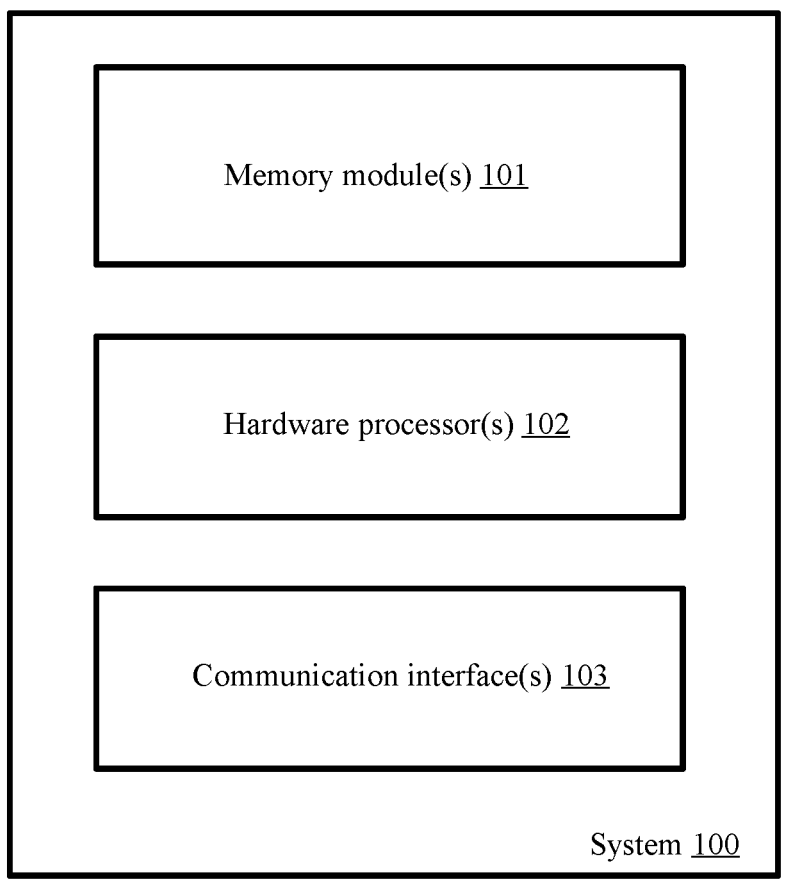
FIG. 1 illustrates an exemplary system for training a neural network for time series data classification, according to some embodiments of the present disclosure.

FIG. 1 illustrates an exemplary system for training a neural network for time series data classification, according to some embodiments of the present disclosure. The system 100 includes one or more hardware processors 102, communication interface(s) or input/output (I/O) interface(s) 103, and one or more data storage devices or memory module 101 operatively coupled to the one or more hardware processors 102. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

The memory module(s) 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 101. The memory module(s) 101 is configured to store operational instructions which when executed cause one or more of the hardware processor(s) 102 to perform various actions associated with the training of the neural network and time series data classification using the neural network. The various steps involved in the process of training the neural network and the time series data classification are explained with description of FIG. 2. All the steps in FIG. 2 are explained with reference to the system of FIG. 1.

Figure 2:
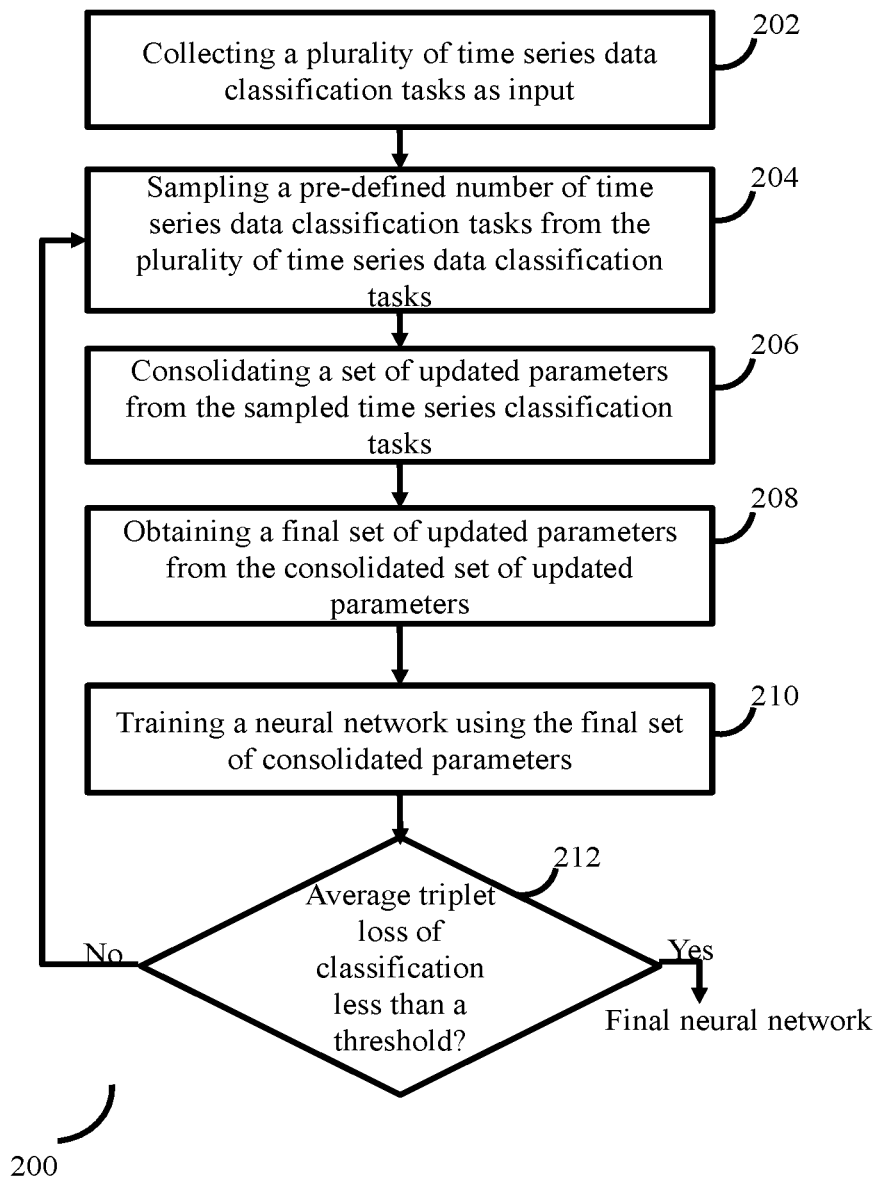
FIG. 2 is a flow diagram depicting steps involved in the process of training a neural network for time series data classification, using the system of FIG. 1, according to some embodiments of the present disclosure.

FIG. 2 is a flow diagram depicting steps involved in the process of training a neural network for time series data classification, using the system of FIG. 1, according to some embodiments of the present disclosure. Steps 202 through 210 are different stages of data processing involved in the training of the neural network. The system 100 collects (202) a plurality of time series classification tasks (alternately referred to as 'tasks'), as input. In an embodiment, the tasks may be of different types. For example, one task corresponds to classification of time series data related to weather, whereas another task corresponds to classification of time series data related to an industrial process monitoring.

The system then samples (204) each of a specific number of tasks from the plurality of tasks, wherein the 'specific number of tasks' is pre-defined or is dynamically configured with the system 100. For example, based on the requirements, an authorized person may use appropriate interface provided by the communication interface(s) 103 to define value of the 'specific number of tasks'. Further, any suitable sampling technique can be used to sample the specific number of tasks.

By sampling the specific number of tasks, the system 100 consolidates (206) a set of updated parameters corresponding to each of the specific number of tasks. After consolidating the set of updated parameters, the system 100 obtains (208) a final set of updated parameters from the consolidated sets of updated parameters of all of the specific number of tasks, using equation (4).

The system 100 uses the final set of updated parameters to train (210) a neural network. When training of the neural network is to being performed in a scenario in which sufficient training data is not available, the final set of updated parameters generated by the system 100 can be used to substitute missing data and in turn to train the neural network.

After training the neural network, the system 100 performs time series classification of any task given using the neural network and uses a triplet loss based approach to determine accuracy of the classification that had been performed by learning rich time-series embedding for ensuring higher accuracy in given classification tasks. If an average triplet loss calculated/determined by the system 100 is found to be less than a threshold, then the system 100 may store the neural network in latest state as a 'Final neural network', which is further used by the system 100 to perform time series classification for input tasks. If the average triplet loss calculated/determined by the system 100 is found to be exceeding the threshold, then the system repeats 204 to 210 to update and fine-tune the neural network. In various embodiments, the steps in method 200 may be performed in the same order as depicted in FIG. 2 or in any alternate order which is technically feasible. In another embodiment, one or more of the steps in method 200 may be omitted as per requirements.

The method 200 is further elaborated below:

Problem in the time series classification domain that is being addressed by the system 100 is training of neural network in the absence of sufficient training data. This is also known as K-shot learning problem. Consider a K-shot learning problem for a time series classification data sampled from a distribution p(T) that requires learning a multi-way classifier for a test task given only K labeled time series instances per class. The system 100 is used to obtain a neural network with parameters ø that is trained to solve several K-shot tasks sampled from p(T). The K-shot learning tasks are divided into three sets: a training meta set $S^{tr}$, a validation meta-set $S^{va}$, and a testing meta-set $S^{te}$. The training meta-set is used to obtain the parameters Ø, the validation meta-set is used for model selection, and the testing meta-set is used for evaluating results of the time series classification being performed by the system 100.

Each task instance $T_j \sim p(T)$ in $S^{tr}$ and $S^{va}$ consists of a labeled training set of univariate time series $D_j^{tr} = \{(x_j^{n,k}, y_j^{n,k}) \vee k=1 \ldots K; n=1 \ldots N_j\}$, where K is number of univariate time series instances for each of the $N_j$ classes. Each univariate time series $x=x_1, x_2, \ldots x_T$ with $x_t \in R$ for $t=1, \ldots, T$, where T is length of time series and y is class label. Tasks in $S^{tr}$ and $S^{va}$ only contain a training set, whereas each task in $S^{te}$ contains a testing set $D_j^{te} = \{(x_j^{n,k}, y_j^{n,k}) \vee K=1 \ldots, K'; n=1 \ldots N_j\}$ apart from a training set $D_j^{tr}$. The classes in $D_j^{tr}$ and $D_j^{te}$ are same, whereas classes across tasks are usually different. For any $x_j^{n,k}$ from $D_j^{te}$, goal is to estimate corresponding label $y_j^{n,k}$ obtained by using an updated set of parameters Ø obtained by fine-tuning the neural network using $K*N_j$ labeled samples from $D_j^{tr}$.

Figure 3:
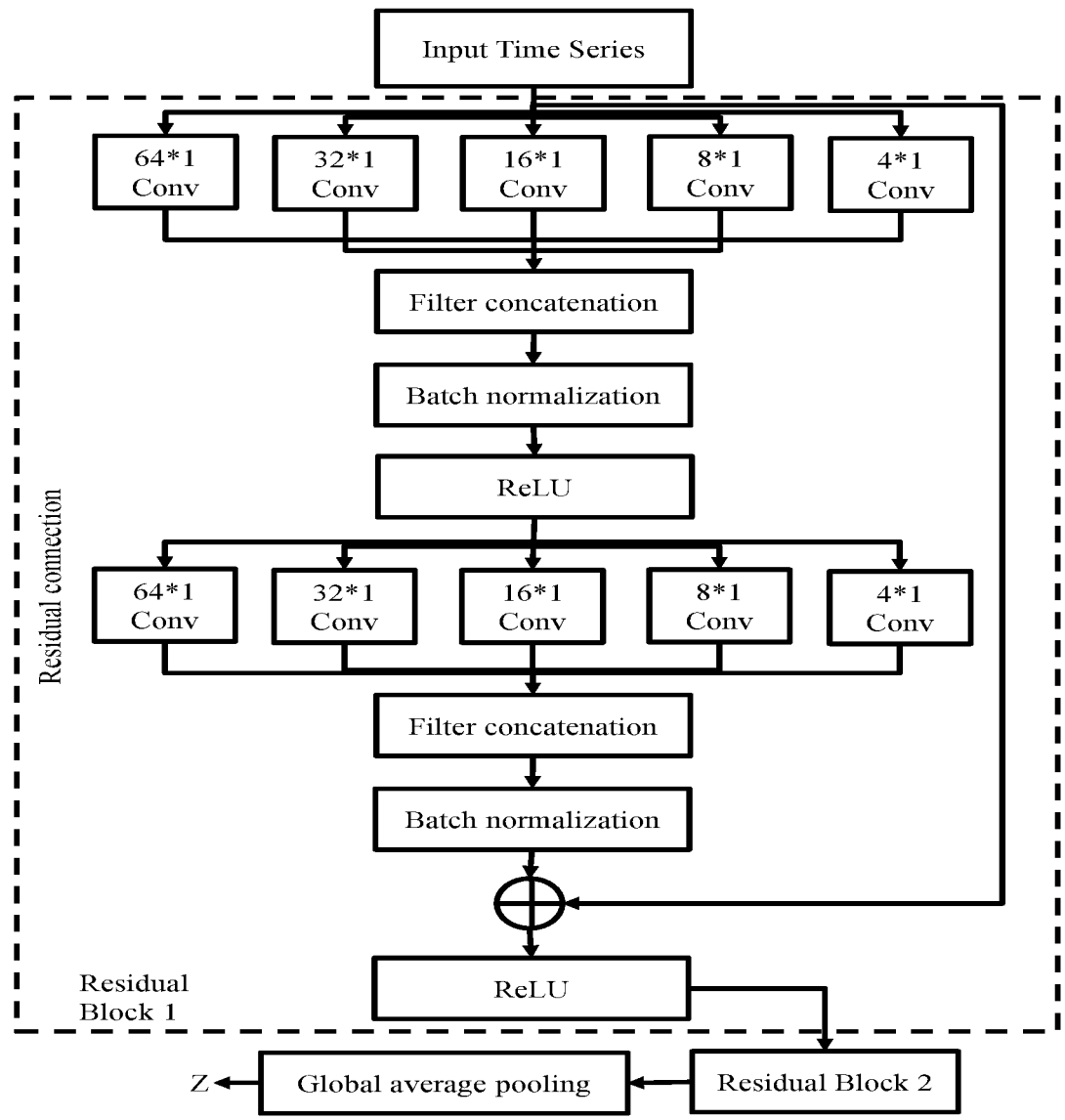
FIG. 3 depicts Convolutional Neural Network architecture used by the system of FIG. 1, according to some embodiments of the present disclosure.

The neural network being considered by the system 100 may be of any suitable type. For the purpose of explanation, a residual network (ResNet) consisting of multiple convolutional blocks with shortcut residual connections between them, followed a global average pooling layer such that the network does not have any feedforward layers at the end is considered. Each convolutional block consists of a convolutional layer followed by a batch normalization (BN) layer which acts as a regularizer. Each BN layer is in turn followed by a ReLU layer. This architecture is depicted in FIG. 3.

In order to process a newly assigned time series classification task, the neural network should be able to extract temporal features at multiple time scales and further need to ensure that the neural network can generalize to time series of varying lengths across tasks. In order to ensure this, filters of multiple lengths are used in each convolution block to capture temporal features at various scales. The residual network takes a univariate time series x of any length T as input and converts it to a fixed dimensional feature vector $z \in R^m$, where m is number of filters in a final convolution layer. All trainable parameters of the residual network consisting of filter weights and biases across convolution layers and BN layer by ø.

Use of the triplet loss based approach as training objective to obtain a desirable output allows generalization to varying number of classes without introducing any additional task specific parameters. Triplet loss relies on pairwise distance between representations of time series samples from within and across classes, irrespective of the number of classes. Using triplet loss at time of fine-tuning for the test task, therefore, allows the neural network to adapt to a given few-shot classification task without introducing any additional task-specific parameters. Triplets consist of two matching time series and a non-matching time series such that the loss aims to separate the positive pair from the negative by a distance margin. Given a set $S_j$ of all valid triplets of time series for a training task $T_j$ of the form $(x_i^a, x_i^P, x_i^n) \in S_j$ consisting of an anchor time series $x_i^a$, a positive time series $x_i^P$, and a negative time series $x_i^n$; where the positive time series is another instance from same class as the anchor, while the negative is from a different class than the anchor. Representations are obtained such that the distance between the representations of an anchor and any positive time series is lower than the distance between the representations of the anchor and any negative time series. The system 100 can be configured to consider the triplet loss based on Euclidean norm, expressed as:

$$\|z_i^a - z_i^n\|_2^2 - \|z_i^a - z_i^P\|_2^2 > \alpha \quad (1)$$

Where $\alpha > 0$ is distance margin between positive and negative pairs, and loss to be minimized is given by:

$$\mathcal{L}_{T_j} = \Sigma_{i=1}^{|S_j|} [\|z_i^a - z_i^P\|_2^2 - \|z_i^a - z_i^n\|_2^2 + \alpha]_+ \quad (2)$$

Where $[z]_+ = \max(z, 0)$, such that only the triplets violating the constraint in equation (1) contribute to the loss. As triplet loss approach is used for training the neural network, number of instances per class $K > 1$.

To elaborate the training of the neural network, consider that the system 100 uses a first order gradient descent based meta learning algorithm (FS-1), and a simpler variant of FS-1 (referred to as FS-2).

FS-1 learns an initialization for the parameters ø of the ResNet such that these parameters can be quickly optimized using gradient-based learning at test time to solve a new task i.e., the model generalizes from a small number of examples from the test task. In order to learn the parameters ø, the system 100 trains the neural network on a variety of tasks with varying number of classes and time series lengths. The residual network yields a fixed-dimensional representation for varying length time series, and nature of the loss function is such that it does not require any changes due to varying number of classes across tasks. For the aforementioned reasons, the same neural network parameters ø across the tasks.

Figure 4:
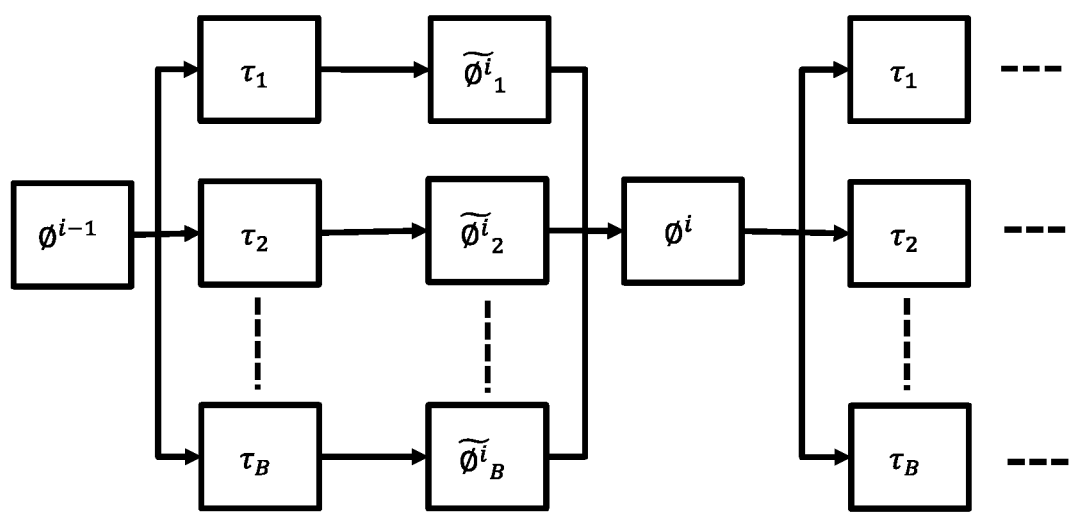
FIG. 4 depicts few-shots learning approach being performed by the system of FIG. 1, according to some embodiments of the present disclosure.
Figure 5A:
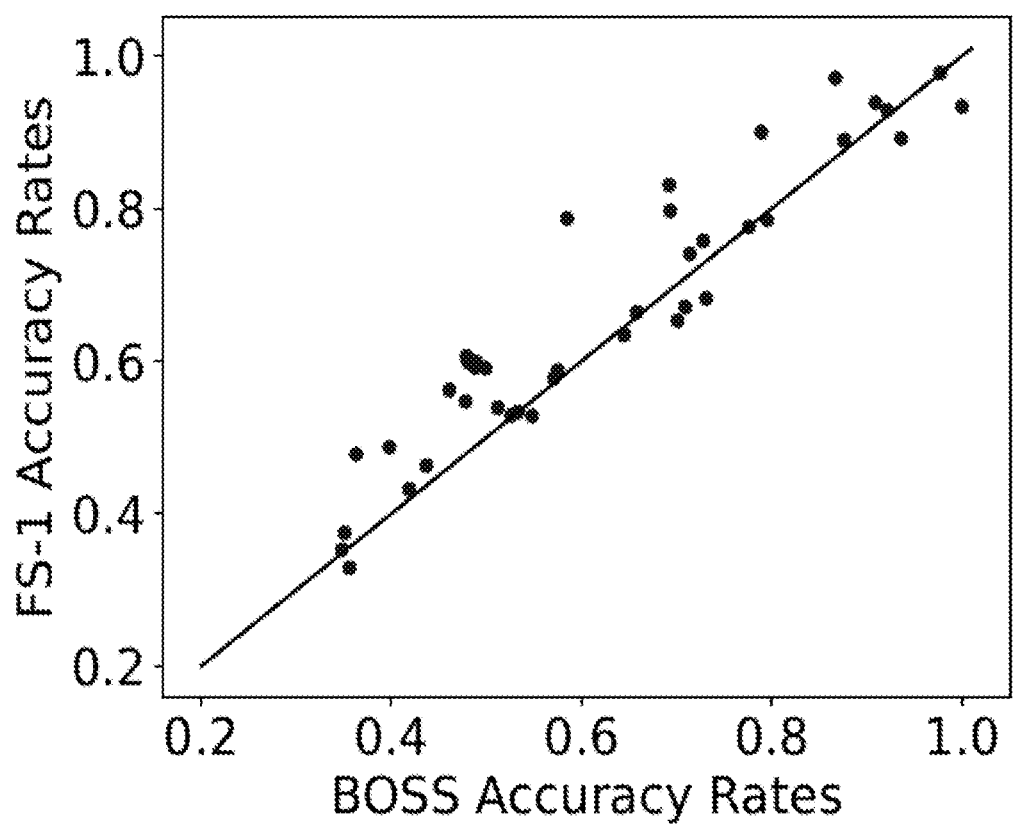
FIG. 5A through FIG. 5D are example diagrams depicting comparison of 5-shot univariate time series data classification being performed by the system of FIG. 1 with state of art techniques, according to some embodiments of the present disclosure.
Figure 5B:
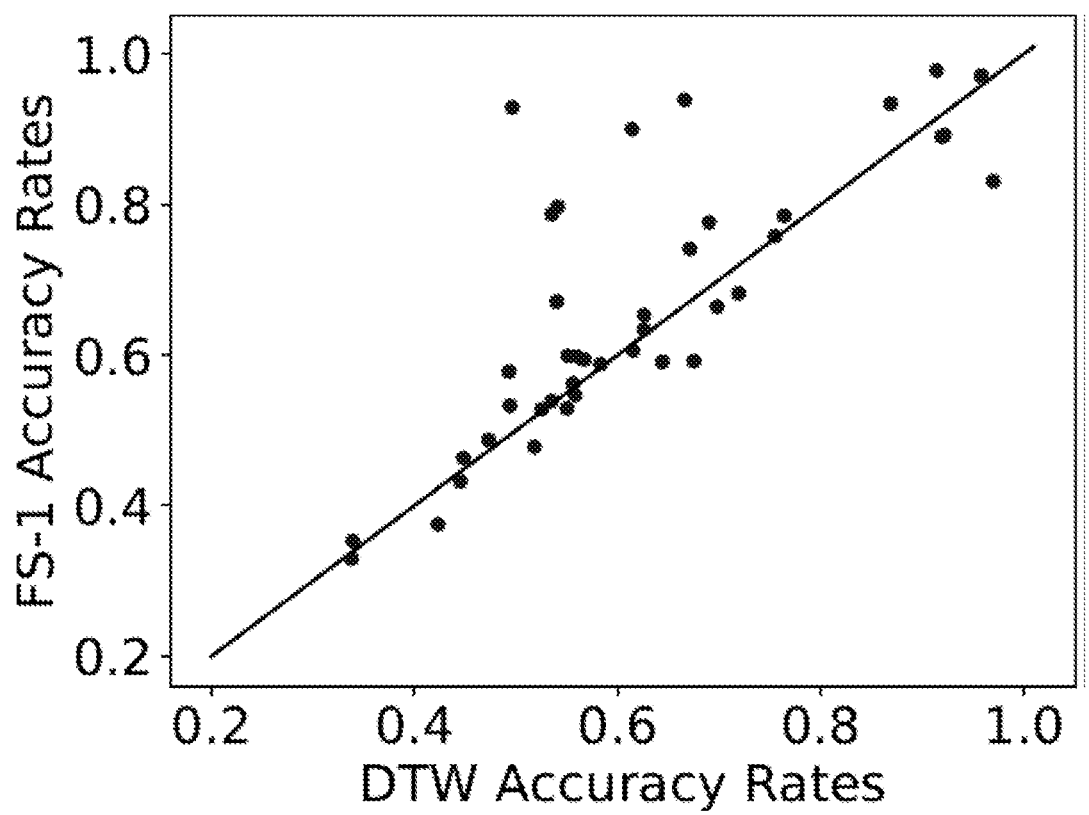
Figure 5C:
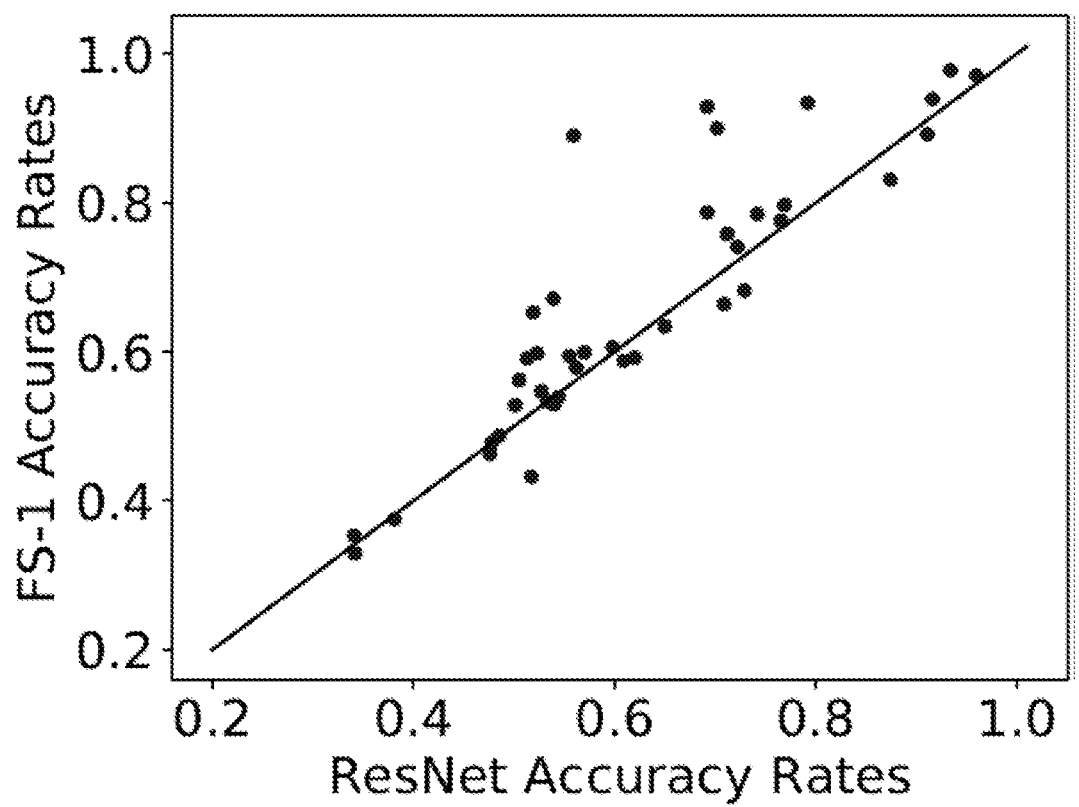
Figure 5D:
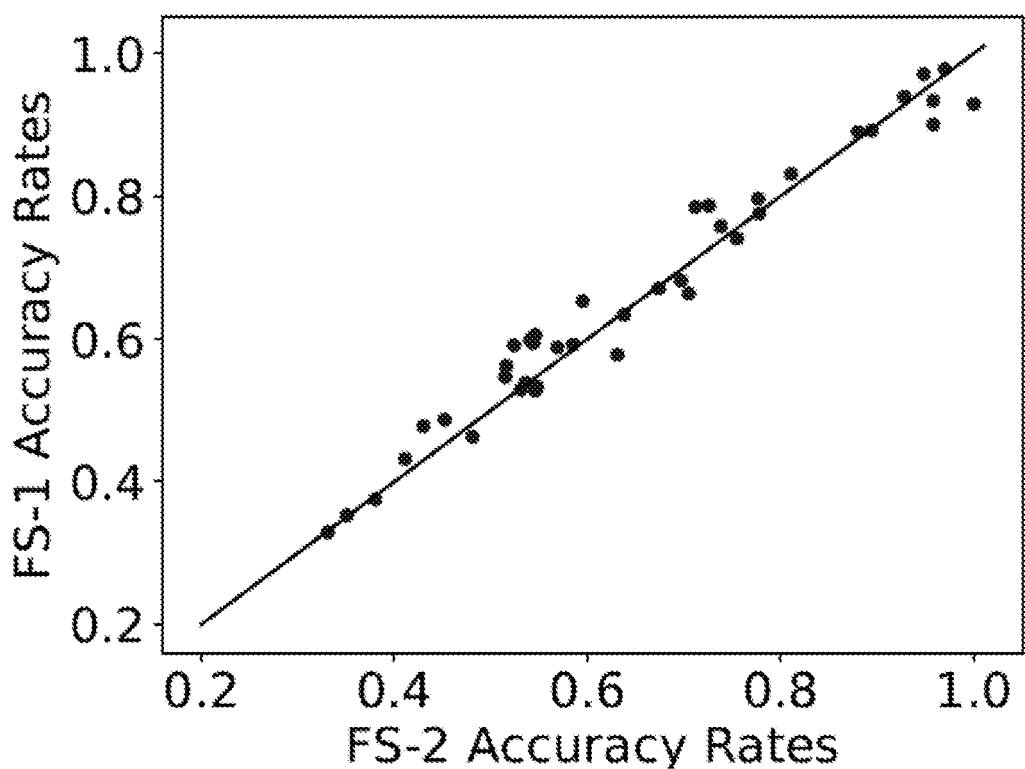

For the training of the neural network, the system 100 finds an initial set of parameters ø such that for a randomly sampled task $T_j$ with corresponding loss $\mathcal{L}_{T_j}$ (as in equation 3) learner has low loss after k updates, such that:

$$\text{minimize}_\emptyset E_{T_j} [\mathcal{L}_{T_j} (U_{T_j}^k(\emptyset))] \quad (3)$$

Where $U_{T_j}^k$ is an operator that updates ø using k mini batches from $D_j^{tr}$ FS-1 sequentially samples few-shot tasks from the set of tasks $S^{tr}$. As depicted in FIG. 4, meta learning procedure adopted by the system 100 includes M meta iterations. Each meta-iteration involves B K-shot tasks, and each task is solved using k steps of gradient based optimization which involves randomly sampling mini batches from $K*N$ instances in the task.

Considering that each task has a varying number of instances owing to varying N, number of iterations for each task is set to $$k = \left[\frac{K*N}{b}\right] * e,$$

where b is the mini-batch size and e is the number of epochs. Instead of fixing the number of iterations k for each sampled task, the number of epochs e across datasets is fixed such that the network is trained to adapt quickly in a fixed number of epochs. Also, the number of triplets in each batch is significantly more than the number of unique time series in a mini-batch.

The system 100 may use any suitable approach to initialize filter weights of the residual network. For example, orthogonal initialization approach may be used by the system 100. In this approach, in $i^{th}$ meta-iteration, the residual network for each of the B-tasks is initialized with $\emptyset^{i-1}$. Each task $T_j$ with labeled data $D_j^{tr}$ is solved by updating parameters $\emptyset^{i-1}$ of the network k times to obtain $\tilde{\emptyset}_j^i = U_{T_j}^k(\emptyset^{i-1})$.

In effect the system 100 uses a batch version of optimization problem in equation 3 and a meta-batch of B tasks to update ø as:

$$\emptyset^i = \emptyset^{i-1} + \in \frac{1}{B}\sum_{j=1}^{B}(\tilde{\emptyset}_j^i - \emptyset^{i-1}) \quad (4)$$

Here, $\tilde{\emptyset}_j - \emptyset$ with k>1 implies that ø is updated using updated values $\tilde{\emptyset}_j$ obtained after solving B tasks for k iterations each. Optimal parameters of the residual network after the meta-training are denoted as ø and are used as initialization parameters for initializing target task specific residual network. For each new task with labeled instances in $D^{tr}$ and any test time series x taken from $D^{te}$, first ø is updated to $\tilde{\emptyset}$ using $D^{tr}$. To obtain class corresponding estimate embeddings for all the N*K samples in $D^{tr}$ is compared to the embedding for x using an appropriate classifier.

In FS-2 instead of updating the parameters ø by collectively using updated values from B tasks, ø is continuously updated at each mini-batch irrespective of the task. As a result, the network is trained for a few iterations on a task, and then the task is changed.

The final neural network (NN) that is used for initialization of a task is fine-tuned using a small labeled training set of new test time series classification task and then the time series classification is performed on the test set using a classifier.

Experimental Setup:
a. Sampling:

The experiment was conducted by restricting distribution of tasks to univariate time series classification (UTSC) with a constraint on maximum length of time series such that T≤512. Tasks from publicly available archives of UTSC datasets were sampled, where each dataset corresponds to a N-way multi-class classification task with number of classes N and length of time series T varies across datasets, and all the time series in any data set are of the same length. Each time series is z-normalized using mean and standard deviation of all the points in the time series.

18 datasets were selected and used to sample tasks for training meta-set $S^{tr}$, and 6 datasets to sample tasks for the validation meta-set $S^{v'}$. Any task in $S^{tr}$ or $S^{v'}$ has K randomly sampled time series for each of the N classes in the dataset. Remaining 41 datasets were used to create tasks for testing meta-set. Each dataset is an N way classification problem with an original train and test split. 100 K-shot tasks were sampled from each of the 41 datasets. Each of the 100 tasks sampled contains K samples from each of the N classes for $D^{tr}$ and K' samples from each of the N classes for $D^{te}$ for each task are sampled from respective original train and test split of the dataset. The K (or K') samples of each of the class in $D^{tr}$ (or $D^{te}$) are sampled uniformly from entire set of samples of the respective class. $D^{tr}$ is used to fine-tune ø*, and $D^{te}$ is used to evaluate the updated task specific model $\tilde{\emptyset}$ Hyper-parameters for FS-1 and FS-2:

On the basis of initial experiments on a subset of the training meta-set, the residual architecture was used with L=4 layers and m=165 convolution filters per layer. An Adam optimizer with learning rate of 0.0001 was used for updating Ø on each task while using $\in$=1 in meta-update setup in equation (4). FS-1 and FS-2 were trained for a total of M=2000 meta-iterations with meta-batch size of B=5, and mini batch size b=10. FS-1 and FS-2 were trained using K=5 and 10 for tasks in training meta-set while K=5 is used for validation and test meta-sets. Across all experiments, K'=5 was maintained. The experiments proved that K=10 for tasks in training meta-set gave better results in terms of average triplet loss on validation meta-set. Epochs e=4 were used for solving each task while training the FS-1 and FS-2 models. The number of epochs e' to be used while fine-tuning for tasks in testing meta-set was chosen in the range of 1-100 based on average triplet loss on tasks in validation meta-set. Experiments proved that e'=16 and 8 were effective for FS-1 and FS-2 models respectively. As a result, Ø is fine-tuned for e' epochs for each task in testing meta-set. For triplet loss, α=0.5 was chosen.

For comparison, the following baseline classifiers were considered:
(1) Euclidean Distance (ED): 1 NN based ED, where time series of length T is represented by a fixed-dimensional vector of the same length.
(2) Dynamic Time Warping (DTW): 1 NN based on DTW approach was considered. Leave-one-out cross-validation on $D^{tr}$ of each task was performed to find best warping window in the range of ω=0.02 T, 0.04 T, . . . T, where ω is window length and T is time-series length.
(3) Bag of SFA Symbols (BOSS): BOSS is a time series feature extraction technique that provides time series representations while being tolerant to noise. BOSS provides a symbolic representation based on Symbolic Fourier Approximation (SFA) on each fixed length sliding window extracted from a time series while providing low pass filtering and quantization for noise reduction. The resulting sequence of symbols (words) for each sliding window is converted to a histogram of words under the bag-of-words assumption which is considered to be the final representation of the time series. Hyper-parameters wordLength and normalization are chosen based on leave-one-out cross validation over the ranges {8, 10, 12, 14, 16} and {True, False} respectively, while default values of remaining hyper-parameters is used. 1 NN is applied on the extracted features for final classification decision.
(4) Residual Network (ResNet): Instead of using Ø* obtained via FS-1 or FS-2 as a starting point for fine-tuning, a ResNet based baseline was considered where the model is trained from scratch for each task. The architecture is same as those used for FS-1 and FS-2 (also similar to state-of-the-art ResNet versions. Given that each task has a very small number of training samples and the parameters are to be trained from scratch, ResNet architectures are likely to be prone to overfitting despite batch normalization. To mitigate this issue, apart from the same network architecture as FS-1 and FS-2, smaller networks with smaller number of trainable parameters were considered. More specifically, four combinations resulting from number of $$\text{layers} = \left\{\frac{L}{2}, L\right\}$$

and number or filters per $$\text{layers} = \left\{\left\lfloor\frac{m}{2}\right\rfloor, m\right\}$$

were considered where L=4 and m=165. Further, a model with best overall results among the four combinations was used as baseline viz. number of layers=2 and number of filters=165. Each ResNet model was trained for 16 epochs as for FS-1.

Each task was evaluated using classification accuracy rate on the test set i.e. inference is correct if estimated label is same as corresponding ground truth label. Each task consists of K'*N test samples, wherein performance results of each task equals the fraction of correctly classified test samples. While comparing the data processing being done by the system 100 with various baselines considered, for each dataset, classification error results were averaged over 100 randomly sampled tasks. Table. 1 below depicts comparison of the classification performed by system 100 with a few state of art techniques in terms of ranks over classification accuracy rates on all 4100 tasks from 41 datasets with varying K.

TABLE 1

| K | ED | DTW | BOSS | ResNet | FS-2 | FS-1 |
|---|------|-------|-------|--------|-------|-------|
| 2 | 4.232 | 2.976 | 3.902 | 3.805 | 3.207 | 2.878 |
| 5 | 4.537 | 3.463 | 3.890 | 3.305 | 3.244 | 2.561 |
| 10 | 4.573 | 3.476 | 3.646 | 3.683 | 3.427 | 2.195 |
| 20 | 4.439 | 3.354 | 2.927 | 3.902 | 3.793 | 2.585 |

Table. 2 below shows comparison of ranks across datasets with varying number of classes N in a task. N is number of classes in 5-shot task and n is number of datasets.

TABLE 2

| N | n | ED | DTW | BOSS | ResNet | FS-2 | FS-1 |
|---|---|------|-------|-------|--------|-------|-------|
| 2-5 | 24 | 4.167 | 4.083 | 3.375 | 3.458 | 3.042 | 2.875 |
| 6-10 | 9 | 4.778 | 2.333 | 5.333 | 2.389 | 3.778 | 2.389 |
| >10 | 8 | 5.375 | 2.875 | 3.812 | 3.902 | 3.875 | 1.812 |
| Overall | 41 | 4.537 | 3.463 | 3.890 | 3.305 | 3.244 | 2.561 |

Results:

It was observed that FS-1 improves upon all the baselines considered for 5-shot tasks. The pairwise comparison of FS-1 with other baselines show significant gains in accuracies across many datasets. FS-1 has Win/Tie/Loss (W/T/L) counts of 26/2/13 when compared to the best non-few-shot-learning model, i.e. ResNet. On 27/41 datasets, FS-1 is amongst the top-2 models. FS-2 with a simpler update rule than FS-1 is the second best model but is very closely followed by the ResNet models trained from scratch.

To study the effect of number of training samples per class available in end task, we consider K={2, 5, 10, 20} for $D^{tr}$ and experiment was conducted under same protocol of 4100 tasks. Results can be observed in Table. 1 and indicate that:
FS-1 is the best performing model, especially for 5 and 10-shot scenarios with large gaps in ranks.
When considering very small number of training samples per class, i.e. for K=2, it was observed that FS-1 is still the best model although it is very closely followed by DTW. This is expected as given just two samples per class, it is very difficult to effectively learn any data distribution patterns, especially when the domain of the task is unseen while training. The fact that FS-1 and FS-2 still perform significantly better than ResNet models trained from scratch show the generic nature of filters learned in φ*. As expected, data-intensive machine learning and deep learning models like BOSS and ResNet that are trained from scratch only on the target task data tend to overfit.
For tasks with larger number of training samples per class, i.e. K=20, FS-1 gave best results. As expected, machine learning based state-of-the-art model BOSS performs better than other baselines when sufficient training samples are available and is closer to FS-1.

To study the generalizability of FS-1 to varying N as a result of leveraging triplet loss, the datasets were grouped based on N. As shown in Table 2, it was observed that FS-1 is consistently amongst the top-2 models across values of N. While FS-1 is significantly better than other algorithms for 2≤N≤5 and N>10, it is as good as the best algorithm DTW for 6≤N≤9.

To study the importance of fine-tuning different convolutional layers of FS-1 using training data of the target few-shot task, four variants FS-1-l with l=1, 2, 3, 4, were considered where parameters of lowermost l convolutional layers of the pre-trained model were frozen, while fine-tuning top L-l layers only. It was observed that FS-1-1, i.e. where the filter weights of only the first convolutional layer are frozen while those of all higher layers are fine-tuned, performs better than the default FS-1 model where all layers are fine-tuned. On the other hand, freezing higher layers as well (FS-1-2 and FS-1-3) or freezing all the layers (FS-1-4, i.e. no fine-tuning on target task) leads to significant drop in classification performance. These results indicate that the first layer has learned generic features while being trained on diverse set of K-shot tasks while the higher layers of the FS-1 model are important to quickly adapt to the target K-shot task.

Apart from the above scenario where the UCR datasets used to sample tasks in training, validation and testing meta-sets are different, a scenario where there are a large number of classes within a TSC dataset was considered, and the goal was to quickly adapt to a new set of classes given a model that has been pre-trained on another disjoint set of classes from the same dataset.

Three datasets with large number of classes from the UCR Archive, namely, 50 Words, Adiac and ShapesAll, containing 50, 37, and 60 classes, respectively were considered. Half of the classes (randomly chosen) to form the training meta-set were considered, ¼th of the classes for validation meta-set and remaining ¼th of the classes for testing meta-set. The FS-1 and FS-2 models were trained on 5-shot 5-way TSC tasks from training meta-set for M=50 and B=5. A best meta-iteration was chosen based on average triplet loss on the validation meta-set (also containing 5-shot 5-way classification tasks). Note that ED, DTW and BOSS are trained on the respective task from the testing meta-set only. Also, whenever number of samples for a class is less than 5, all samples for that class in all tasks were taken). It was observed that FS-1 outperforms all approaches on the three datasets, except DTW for 50 Words dataset, and is able to quickly generalize to new classes.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for time series data classification, comprising:
   collecting at least one time series classification task as input, via one or more hardware processors, wherein the time series classification task comprises a training set of time series data, and wherein number of classes across the time series classification tasks varies;
   training a neural network using at least one initial parameter to solve the at least one time series classification task, via the one or more hardware processors, wherein training the neural network comprises:
      iteratively performing till an average triplet loss on a plurality of validation tasks by the neural network is less than a threshold:
         sampling a pre-defined number of time series classification tasks;
         consolidating a set of updated parameters from the sampled time series classification tasks;
         obtaining a final set of updated parameters from the consolidated set of updated parameters; and
         using the final set of updated parameters along with data pertaining to the at least one time series classification task to train the neural network; and
   performing the time series data classification using the neural network, via the one or more hardware processors.

2. The processor implemented method as claimed in claim 1, wherein the final set of updated parameters comprises updated parameters corresponding to each time series classification task from the pre-defined number of time series classification tasks.

3. The processor implemented method as claimed in claim 1, wherein training the neural network by considering the average triplet loss allows the neural network to be used across various time series classification tasks without introducing any additional parameter.

4. A system for time series data classification, comprising:
   one or more hardware processors;
   one or more communication interfaces; and
   one or more memory modules storing a plurality of instructions, wherein the plurality of instructions when executed cause the one or more hardware processors to:
      collect at least one time series classification task as input, wherein the time series classification task comprises a training set of time series data and wherein number of classes across the time series classification tasks varies;
      train a neural network using at least one initial parameter to solve the at least one time series classification task, wherein training the neural network comprises:
         iteratively perform till an average triplet loss on a plurality of validation tasks is less than a threshold:
            sampling a pre-defined number of time series classification tasks;
            consolidating a set of updated parameters from the sampled time series classification tasks;
            obtaining a final set of updated parameters from the consolidated set of updated parameters; and
            using the final set of updated parameters along with data pertaining to the at least one time series classification task to train the neural network; and
      perform the time series data classification using the neural network.

5. The system as claimed in claim 4, wherein the final set of updated parameters comprises updated parameters corresponding to each time series classification task from the pre-defined number of time series classification tasks.

6. The system as claimed in claim 4, wherein training the neural network considering the average triplet loss allows the neural network to be used across various time series classification tasks without introducing any additional parameter.

7. A non-transitory computer readable medium comprising a plurality of instructions for time series data classification, wherein the plurality of instructions when executed cause one or more hardware processors to:
   collect at least one time series classification task as input, wherein the time series classification task comprises a training set of time series data and wherein number of classes across the time series classification tasks varies;
   train a neural network using at least one initial parameter to solve the at least one time series classification task, wherein training the neural network comprises:
      iteratively perform till an average triplet loss on a plurality of validation tasks is less than a threshold:
         sampling a pre-defined number of time series classification tasks;

consolidating a set of updated parameters from the sampled time series classification tasks;

obtaining a final set of updated parameters from the consolidated set of updated parameters; and using the final set of updated parameters along with data pertaining to the at least one time series classification task to train the neural network; and perform the time series data classification using the neural network.

8. The non-transitory computer readable medium as claimed in claim 7, wherein the final set of updated parameters comprises updated parameters corresponding to each time series classification task from the pre-defined number of time series classification tasks.

9. The non-transitory computer readable medium as claimed in claim 7, wherein training the neural network by considering the average triplet loss allows the neural network to be used across various time series classification tasks without introducing any additional parameter.

* * * * *